US007647289B2

(12) United States Patent
Graepel et al.

(10) Patent No.: US 7,647,289 B2
(45) Date of Patent: Jan. 12, 2010

(54) LEARNING BELIEF DISTRIBUTIONS FOR GAME MOVES

(75) Inventors: Thore K H Graepel, Cambridge (GB); Ralf Herbrich, Cambridge (GB); David Stern, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 11/421,913

(22) Filed: Jun. 2, 2006

(65) Prior Publication Data

US 2008/0004096 A1    Jan. 3, 2008

(51) Int. Cl.
*G06F 15/18*    (2006.01)
*G06F 15/00*    (2006.01)
(52) U.S. Cl. ....................................................... 706/62
(58) Field of Classification Search ........................ None
See application file for complete search history.

(56) References Cited

U.S. PATENT DOCUMENTS

2006/0167917 A1*    7/2006    Solomon ..................... 707/101

OTHER PUBLICATIONS

'Spectral Bloom Filters': Cohen, 2003, ACM, 1-58113, pp. 241-252.*
'Learning on Graphs in the Game of Go': Graepel, 2001, Springer Verlag, ICANN 2001, pp. 347-352.*
'Knowledge based search in competitive domains': Walczak, 2003, IEEE, 1041-4347, pp. 734-743.*
'Experiments with a Bayesian game player': Smith, 1996, Citeseer.*
'Experiments with a Bayesian game player': Smith, 1996, pp. 1-37.*
'Computer Go': Muller, 2002, Elsevier, Artificial Intelligence 134 (2002) pp. 145-179.*
Bloom, B. H. "Space/Time Trade-offs in Hash Coding with Allowable Errors", Communications of the ACM, vol. 13, No. 7, Jul. 1970.
Cohen, S. et al. "Spectral Bloom Filters", SIGMOD 2003, Jun. 9-12, 2003, San Diego, CA.
http://www.moyogo.com, 14 pages downloaded Jun. 6, 2006.
Stern, D.H. et al. "Modelling Uncertainty in the Game of Go", 2004, Advances in Information Processing Systems 1b (pp. 33-40).
Zobrist A.L. "A New Hashing Method With Application for Game Playing", The University of Wisconsin.

* cited by examiner

*Primary Examiner*—David R Vincent
*Assistant Examiner*—Peter Coughlan
(74) *Attorney, Agent, or Firm*—Lee & Hayes, PLLC

(57) ABSTRACT

We describe an apparatus for learning to predict moves in games such as chess, Go and the like, from historical game records. We obtain a probability distribution over legal moves in a given board configuration. This enables us to provide an automated game playing system, a training tool for players and a move selector/sorter for input to a game tree search system. We use a pattern extraction system to select patterns from historical game records. Our learning algorithm learns a distribution over the values of a move given a board position based on local pattern context. In another embodiment we use an Independent Bernoulli model whereby we assume each moved is played independently of other available moves.

19 Claims, 15 Drawing Sheets

| + | + | + | + | + | + | + | + | + | + | + | + | + | + | + | + | + | + |
|---|---|---|---|---|---|---|---|---|---|---|---|---|---|---|---|---|---|
| + | 14 | 14 | 14 | 14 | 14 | 14 | 14 | 14 | 14 | 14 | 14 | 14 | 14 | 14 | 14 | 14 | + |
| + | 14 | 14 | 14 | 14 | 14 | 14 | 14 | 13 | 13 | 13 | 14 | 14 | 14 | 14 | 14 | 14 | + |
| + | 14 | 14 | 14 | 14 | 14 | 14 | 13 | 13 | 12 | 13 | 13 | 14 | 14 | 14 | 14 | 14 | + |
| + | 14 | 14 | 14 | 14 | 14 | 13 | 12 | 12 | 11 | 12 | 12 | 13 | 14 | 14 | 14 | 14 | + |
| + | 14 | 14 | 14 | 14 | 13 | 12 | 11 | 11 | 9 | 11 | 11 | 12 | 13 | 14 | 14 | 14 | + |
| + | 14 | 14 | 14 | 13 | 12 | 11 | 10 | 8 | 6 | 8 | 10 | 11 | 12 | 13 | 14 | 14 | + |
| + | 14 | 14 | 13 | 12 | 11 | 10 | 7 | 5 | 4 | 5 | 7 | 10 | 11 | 12 | 13 | 14 | 14 | + |
| + | 14 | 13 | 13 | 12 | 11 | 8 | 5 | 3 | 2 | 3 | 5 | 8 | 11 | 12 | 13 | 13 | 14 | + |
| + | 14 | 13 | 12 | 11 | 9 | 6 | 4 | 2 | 1 | 2 | 4 | 6 | 9 | 11 | 12 | 13 | 14 | + |
| + | 14 | 13 | 13 | 12 | 11 | 8 | 5 | 3 | 2 | 3 | 5 | 8 | 11 | 12 | 13 | 13 | 14 | + |
| + | 14 | 14 | 13 | 12 | 11 | 10 | 7 | 5 | 4 | 5 | 7 | 10 | 11 | 12 | 13 | 14 | 14 | + |
| + | 14 | 14 | 14 | 13 | 12 | 11 | 10 | 8 | 6 | 8 | 10 | 11 | 12 | 13 | 14 | 14 | + |
| + | 14 | 14 | 14 | 14 | 13 | 12 | 11 | 11 | 9 | 11 | 11 | 12 | 13 | 14 | 14 | 14 | + |
| + | 14 | 14 | 14 | 14 | 14 | 13 | 12 | 12 | 11 | 12 | 12 | 13 | 14 | 14 | 14 | 14 | + |
| + | 14 | 14 | 14 | 14 | 14 | 14 | 13 | 13 | 12 | 13 | 13 | 14 | 14 | 14 | 14 | 14 | + |
| + | 14 | 14 | 14 | 14 | 14 | 14 | 14 | 13 | 13 | 13 | 14 | 14 | 14 | 14 | 14 | 14 | + |
| + | 14 | 14 | 14 | 14 | 14 | 14 | 14 | 14 | 14 | 14 | 14 | 14 | 14 | 14 | 14 | 14 | + |
| + | + | + | + | + | + | + | + | + | + | + | + | + | + | + | + | + | + |

FIG. 3

LEARNING BELIEF DISTRIBUTIONS FOR GAME MOVES

TECHNICAL FIELD

This description relates generally to automated systems for playing board games involving two players. It is particularly related to, but in no way limited to automated systems for playing games such as GO, Chess and the like which use probabilistic models.

BACKGROUND

Previous attempts have been made to program computers to play Go. However, performance has not matched the level of chess programs with even the strongest programs having the ability of an average club player. The best Go programs play only at the level of weak amateur Go players and Go is therefore considered to be a serious AI (artificial intelligence) challenge not unlike Chess in the 1960s. There are two main reasons for this state of affairs: firstly, the high branching factor of Go (typically 200 to 300 potential moves per position) prevents the expansion of a game tree to any useful depth. Secondly, it is difficult to produce an evaluation function for Go positions. A Go stone has no intrinsic value; its value is determined by its relationships with other stones. Go players evaluate positions using visual pattern recognition and qualitative intuitions which are difficult to formalize.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

We describe an apparatus for learning to predict moves in games such as chess, Go and the like, from historical game records. We obtain a probability distribution over legal moves in a given board configuration. This enables us to provide an automated game playing system, a training tool for players and a move selector/sorter for input to a game tree search system. We use a pattern extraction system to select patterns from historical game records. Our learning algorithm learns a distribution over the values of a move given a board position based on local pattern context. In another embodiment we use an Independent Bernoulli model whereby we assume each move is played independently of other available moves.

In an example we describe a method of learning probability information for each of a plurality of patterns, each pattern corresponding to a move in a game. Historical game records comprising sequences of moves are used. From those one or more patterns are extracted for each move. Some of the extracted patterns are selected and others discarded in a harvesting process which enables us to achieve generalization. In one example, for each of the selected patterns our system determines patterns corresponding to alternative moves which could have been played. Probability information is learnt for each of the selected patterns on the basis of at least information about the patterns corresponding to alternative moves which could have been played. In some embodiments Bayesian inference is used to learn a probability distribution over legal moves in a given board configuration. In other embodiments, an Independent Bernoulli model is used.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants, games consoles and many other devices Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 3 shows as example of a set of 14 pattern templates;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

We recognize that the complexity of GO, and other games such as Chess and the like, results in uncertainty about the future course and outcome of the game. We aim to model this uncertainty using probability. For example, we focus on the task of predicting moves made by expert Go players. In some embodiments we seek to obtain a probability distribution over legal moves from a given board configuration. In other embodiments we assume that the probability of a given move is independent of other possible moves in a given board configuration.

The Game of Go

The game of Go originated in China over 4000 years ago. Its rules are straightforward. Two players, Black and White, take turns to place stones on the intersections of an N×N grid (usually N=19 but smaller boards are in use as well). All the stones of each player are identical. Players place their stones in order to create territory by occupying or surrounding areas of the board. The player with the most territory at the end of the game is the winner. A stone is captured if it has been completely surrounded (in the horizontal and vertical directions) by stones or the opponent's color.

Figure 1:
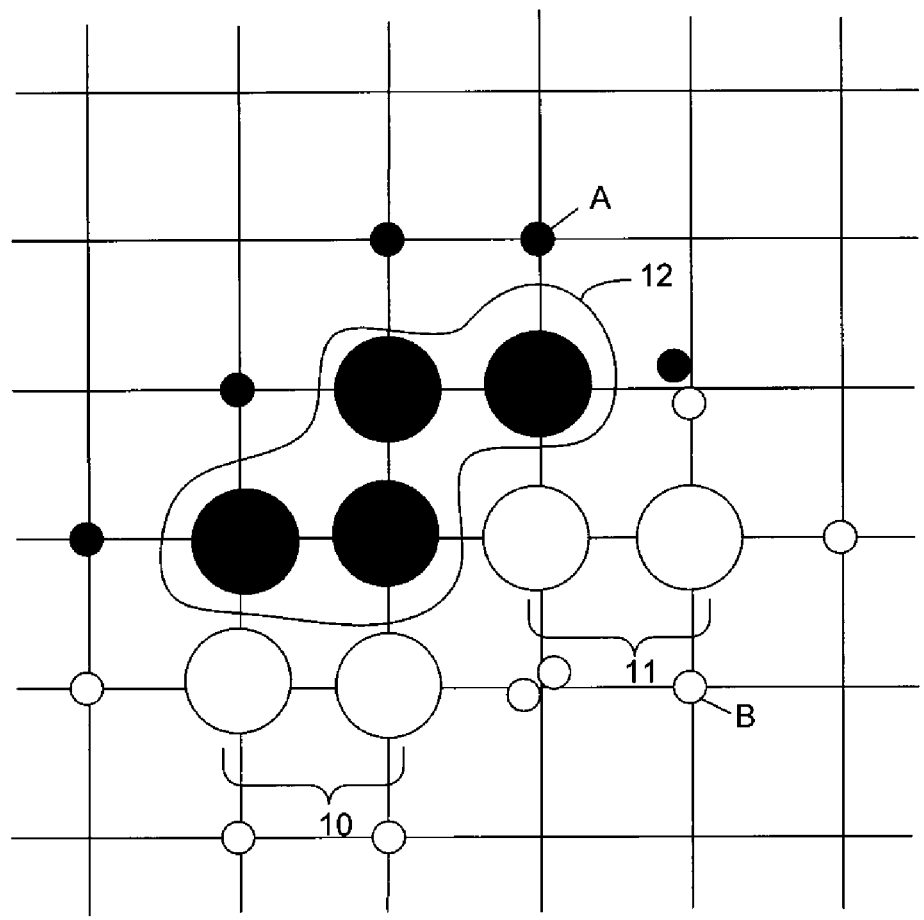
FIG. 1 shows part of a GO board with two chains of white stones and one chain of black stones.
Figure 2A:
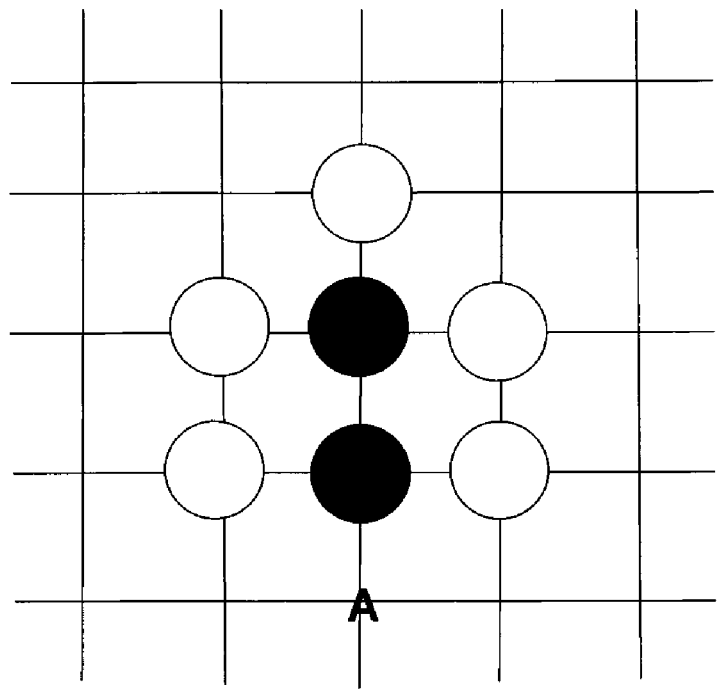
FIG. 2a shows part of a GO board with a chain of black stones.
Figure 2B:
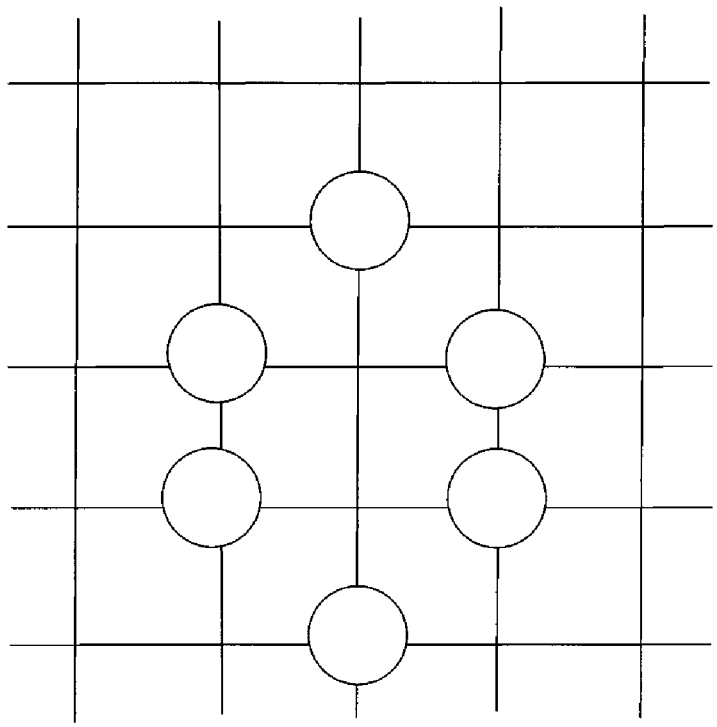
FIG. 2b shows the part of the GO board of FIG. 2a after capture of the black stones.

For example, FIG. 1 shows part of a Go board. The players take turns to place a stone on a grid intersection or point. Empty adjacent points to a store are referred to as liberties. Thus in FIG. 1 small black dots A are used to show the liberties of the black stones. Small white circles B are used to show the liberties of the white stones. FIG. 1 shows two chains of white stones 10, 11 and one chain of black stones 12. Stones in a chain share their liberties. When a stone or a chain of stones is surrounded by opponent stones it has no liberties and is therefore captured and removed from the board. For example FIG. 2a shows a region of a Go board. If white plays at A in that situation, then the black chain loses its last liberty. The black chain is then captured and removed from the board as illustrated in FIG. 2b. A player may pass instead of placing a stone. The game ends when both players pass consecutively. The game is then scored with the highest scoring player being the winner. For example, according to Japanese rules a player's score is the number of empty points enclosed by his or her stones plus the number of points occupied by his or her stones. Full details of the rules of Go are not given here because they are widely publicly available, for example, in "The Game of Go", Matthew Macfadyen, 1998 Carlton Books Limited, ISBN 1858684919. Despite the fact that the rules are simple the resulting game play is very complex and interesting. For example, to cover the largest area one needs to spread out but to secure an area of the board it is good to play stones close together. Also, to try to cover a large area, expansionist play is needed but this potentially leaves weaknesses that can be exploited by the opponent. If a player places stones far from the edge of the board the opponent has space to invade but placing stones close to the edge gives reduced territory and influence.

Patterns, Pattern Templates and Pattern Classes

We define a pattern as an exact arrangement of stones (or other playing pieces) within a sub-region of a board (or other defined playing space comprising a grid), centered on an empty location where a move is to be made. The possible sub-regions are preferably specified as pattern templates as described below. By focusing on exact local patterns for move prediction we achieve advantages. We are able to match patterns very efficiently because of their local range and because the matching procedure does not have to take into account wildcards, i.e., parts of the patterns that match to more than one possible value. As a result we can train our system on a very large number of games without requiring impractical processing capacity and time. Also, we can generate moves for play very quickly because we are able to match the patterns very efficiently.

Figure 4:
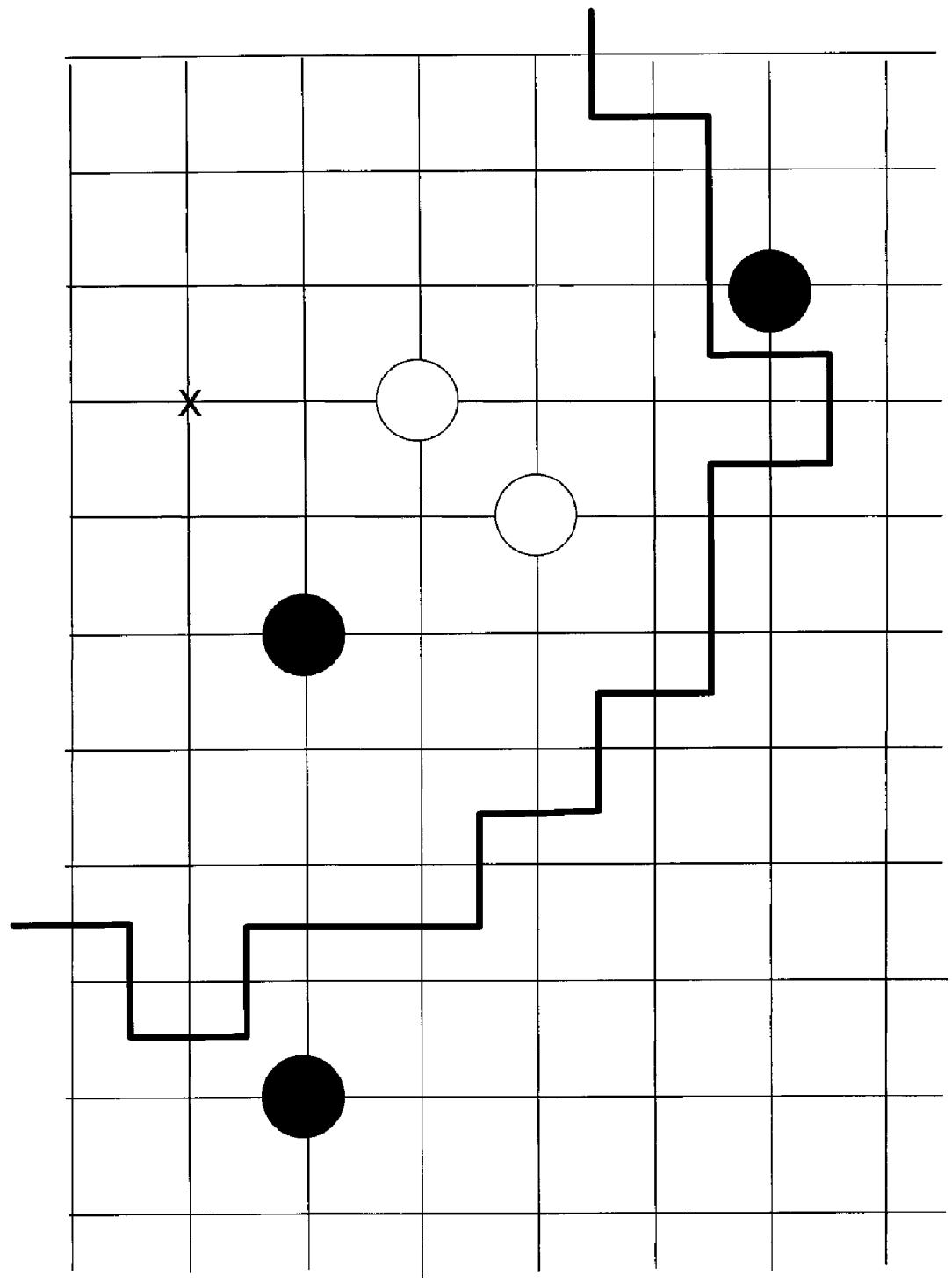
FIG. 4 shows part of a Go board with pattern template T11 centered about grid point 2-4.

In a preferred embodiment, the pattern templates are a nested sequence of increasing size so as to be able to use large patterns with greater predictive power when possible, but to be able to match smaller patterns when necessary. FIG. 3 shows an example of a sequence of 14 nested pattern templates. In this example, template 1 comprises the square labeled 1, template 2 comprises the squares labeled either 1 or 2, template 3 comprises the squares labeled 1, or 2 or 3 and so on. Template 14 comprises all the squares including those extending beyond the plot as indicated by "+". FIG. 4 shows part of a board configuration from an expert game. Pattern template T11 is shown centered about the grid point marked with a cross in that FIG. 4.

We automatically generate and learn from the patterns in two distinct processes. Firstly we harvest sufficiently frequent patterns from historical game records and then we learn from those patterns. The historical game records are preferably taken from games involving expert players although this is not essential. In one group of embodiments we learn urgencies for the patterns (or pattern classes as explained later) using a ranking model. In another group of embodiments we learn an estimate of a play probability (probability of being played) for each pattern or pattern class. Both groups of embodiments use types of Bayesian inference. Each board configuration contains a subset of the harvested move-patterns of which the player in the historical record chooses one. In the urgency embodiment, this information indicates that the chosen move-pattern has a higher urgency than that of the other possible patterns. In the play probability embodiments if an available move is observed as played its probability estimate is increased and if it is observed as not being played its probability estimate is decreased. It is this information together with the fact that typical move-patterns occur in more than one position that allows the system to generalize across specific board configurations.

In some embodiments we advantageously group patterns into pattern classes in order to reduce computational complexity, storage requirements, computation time, required processing capacity and the like. However, it is not essential to use pattern classes. Computations can be carried out for each individual member of a pattern class.

We recognize that every pattern can occur in up to 16 different ways in the case of GO and in other multiples for other games depending on allowable board configurations etc. For example, in the case of GO, the 16 different ways can be thought of as the 8 different symmetries of a square (which can be rotated through 0, 90, 180 and 270 degrees for itself and for its mirror image) and each of these 8 different symmetries can occur for either black or white playing pieces (color reversal) giving 16 different options. A pattern class is then an exact arrangement of playing pieces within a sub-region of the board, centered on an empty location where a move is to be made, and all the other equivalent patterns occurring as a result of symmetries and/or color reversal.

Pattern Harvesting

In order to learn from a huge number of known Go board moves (or board moves of other games such as Chess and the like) from historical game records we are faced with a number of problems. The large number of board moves per game (e.g. 250) leads to problems when we need to learn from large numbers of games. These problems are associated with limits on processing capacity, storage capacity and the like. In addition, we require some degree of generalization in order to learn effectively.

That is, in systems which learn by example, if all historical examples are stored without generalization, it is difficult to deal with new instances that have not been observed before. Instead, it is preferred to make generalizations where possible such that new instances can be appropriately dealt with. In the present case we achieve this generalization in the case of games such as GO, Chess and other games involving configuration of playing pieces, by selecting less than the full set of pattern classes from historical game moves for use by a learning system. In the present application we refer to this selection process as pattern harvesting. We recognize that a particular problem with such pattern harvesting lies in deciding which patterns to harvest and which to ignore. One option is to randomly select, or select in some arbitrary manner, a specified proportion of historical patterns from game records. In another embodiment we select those patterns which occur multiple times in the complete set of historical game records. For example, in a preferred embodiment, we select any pattern which occurs more than once in the complete set of game records. However, it is also possible to select only those patters which occur 2 or more times: or 3 or more times and so on. This is based on the consideration that if a pattern is observed more than once in the training sample then it is likely to be observed (and hence useful) in new board configurations. Any suitable selection criteria can be used.

For example, we used a training set made up of 181,000 Go games, each game having about 250 moves. We used a set of 14 different pattern templates giving about 600 million patterns at our disposal (181,000×250×14=635,500,000). Of these we selected those patterns that appear as a move at least twice in the collection. This enabled us to retain about 2% (about 12 million) of the observed patterns and discard around 98% of those. However, these figures are examples only; other suitable sizes of collection and selection rates can be used.

With huge numbers (e.g. 600 million) of patterns at our disposal it is a difficult task to identify those patterns which occur at least twice in the collection. Even if enough memory is available to store the 600 million patterns there is an efficiency issue to go through this list to find patterns occurring at least twice. This problem is general in that it is not specific to GO moves or moves of other games. Any situation in which there are a large number of records from which it is required to select a sub-set on the basis of a non-trivial criterion is applicable.

In order to address this problem we use a Bloom filter approach. Bloom filters are described in Bloom, BH (1970) "Space/time trade-offs in hash coding with allowable errors", Communications of the ACM, 13, 422-426. A Bloom filter can be used to test whether an element is a member of a set using a space-efficient probabilistic data structure. It is asymmetric in the sense that false positives are possible but false negatives are not. So in the case of selecting GO move patterns which occur twice or more, a false positive involves selecting a pattern in error when it actually occurs only once in the collection. A false negative involves rejecting a pattern which should have been selected. In our GO, and other game situations, we recognize that it is much more valuable to prevent false negatives than to prevent false positives and so Bloom filters are suitable in this respect. Because there are relatively few patterns which occur twice or more we prefer to retain all such patterns. Having said that, other embodiments in which selection methods do make false negatives can be used.

In an example we use a spectral Bloom filter which is an extension of the original Bloom filter to multi-sets, allowing the filtering of elements whose multiplicities are below a threshold given at query time. Spectral Bloom filters are described in "Spectral Bloom filters", Saar Cohen, Yossi Matias, Proceedings of the 2003 ACM SIGMOD international conference on Management of Data, 241-252, 2003.

When a pattern is found in the historical game records then it is first tested if that pattern has been stored in the Bloom filter before. If it has, then the current occurrence must be at least the second time that the pattern is observed and we can add it to our collection (e.g., store it in a hash table). If it has not been previously stored in the Bloom filter, we store it and move on to the next pattern.

Board and Pattern Representation

We represent the Go board as a lattice $\zeta:=\{1,\ldots,N\}^2$ where N is the board size and is usually 9 or 19. In order to represent patterns that extend across the edge of the board in a unified way, we expand the board lattice to include the off-board areas. The extended board lattice is $\hat{\zeta}:=\{\vec{v}+\vec{\Delta}:\vec{v}\in\zeta,\vec{\Delta}\in D\}$ where the offset vectors are given by $D:=\{-(N-1),\ldots,(N-1)\}^2$ and we will use the notation $\vec{v}:=(v_x,v_y)$ to represent 2-dimensional vertex vectors. We define a set of "colors" $C:=\{b,w,e,o\}$ (black, white, empty, off). Then a board configuration is given by a coloring function $c:\hat{\zeta}\to C$ and we fix the position for off-board vertices $\forall \vec{v}\in\hat{\zeta}\backslash\zeta : c(\vec{v})=o$.

Our analysis is based on a fixed set T of pattern templates $T\subseteq \mathcal{T}$ on which we define a set $\Pi$ of patterns $\pi:T\to C$ that are used to represent moves made in a given local context. The patterns preferably have the following properties:

The pattern templates T are rotation and mirror symmetric with respect to their origin, i.e. we have that $(v_x,v_y)\in T \Rightarrow (-v_x,-v_y)\in T$ and $(v_y,-v_x)\in T$, thus displaying an 8-fold symmetry.

Any two pattern templates $T,T'\in\mathcal{T}$ satisfy that either $T\subset T'$ or $T'\subset T$. For convenience, we index the templates $T\in\mathcal{T}$ with the convention that $i<j$ implies $T_i\subset T_j$, resulting in a nested sequence (see FIG. 3).

We have $\pi(\vec{0})=e$ for all patterns because for each pattern to represent a legal move the centre point must be empty.

The set of patterns $\Pi$ is closed under rotation, mirroring and color reversal, i.e. if $\pi\in\Pi$ and $\pi'$ is such that it can be generated from $\pi$ by any of these transformations then $\pi'\in\Pi$. In this case, $\pi$ and $\pi'$ are considered equivalent, $\pi\sim\pi'$, and we define a set $\tilde{\Pi}$ of equivalence classes $\tilde{\pi}\subset\Pi$.

Note that $\tilde{\Pi}$ is a partition of $\Pi$ and thus mutually exclusive, $\cap_{\tilde{\pi}\in\tilde{\Pi}}\tilde{\pi}=\emptyset$, and exhaustive, $$\bigcup_{\tilde{\pi}\in\tilde{\Pi}}\tilde{\pi}=\Pi.$$

We say that a pattern $\pi\in\Pi$ matches configuration c at vertex $\vec{v}$ if for all $\vec{\Delta}\in T(\pi)$ we have $c(\vec{v}+\vec{\Delta})=\pi(\vec{\Delta})$. Note that $T(\pi)$ is the template for the pattern $\pi$. We say that pattern class $\tilde{\pi}\in\tilde{\Pi}$ matches configuration c at vertex $\vec{v}$ if one of its constituent patterns $\pi\in\tilde{\pi}$ matches c at $\vec{v}$.

Local Features

In order to extend the predictive power of the smaller patterns and hence improve generalization we optionally incorporate one or more additional features into each pattern. For example, one or more of the following local features of a move can optionally be used:

Liberties of new chain (2 bits). The number of liberties of the chain of stones we produce by making the move. In a preferred embodiment we limit the values of this local features to being any of $\{1, 2, 3, >3\}$. However, this is not essential, any suitable values for this local feature can be used. The number of 'liberties' of a chain of stones is the lower bound on the number of opponent moves needed to capture the chain.

Liberties of opponent (2 bits). The number of liberties of the closest opponent chain after making the move. Values are preferably, but not essentially any of $\{1, 2, 3, >3\}$.

Ko (1 bit). Is there an active Ko on the board? A 'Ko' is a move which is illegal because it would cause an earlier board position to be repeated.

Escapes atari (1 bit). Does this move bring a chain out of Atari? A chain is in 'atari' if it can be captured immediately.

Distance to edge (2 bits). Distance of move to the board edge. Values are preferably but not essentially selected from $\{<3, 4, 5, >5\}$.

We define the set of labels of these features as $F=\{1, \ldots, 8\}$. Given a move $\vec{v}$ in position c the function $f_c: F \times \zeta \rightarrow \{1,0\}$ maps each feature to its binary true/false value. It is worth noting that for the larger patterns these features are already seen in the arrangement of stones within the template region so the larger patterns are less likely to be altered by the addition of these features.

Pattern Matching and Storing

In a preferred embodiment we do not use an explicit representation of the patterns but define a hash key for patterns and store their properties in a hash table. However, it is not essential to do this. The pattern properties can be stored in any suitable manner or alternatively the patterns themselves can be stored together with their properties. In the hash key example, we advantageously adapt a Zobrist hashing method (Zobrist, A. 1990 "A new hashing method with applications for game playing". ICCA Journal, 13, 69-73), which has the advantage that it can be updated incrementally. For example, we generate four sets of 64 bit random numbers, $h_\alpha: \tilde{\zeta} \rightarrow \{0, \ldots, 2^{64}-1\} \alpha \in C$, four for each vertex in the extended Go lattice $\tilde{\zeta}$. We also generate a random number for each of the local features $l: F \rightarrow \{0, \ldots, 2^{64}-1\}$. The hash-key $k(\pi, \vec{v}, c)$ of a given pattern $\pi$ at vertex $\vec{v}$ in board configuration c can be calculated by XORing together the corresponding random numbers, $$k(\pi, \vec{v}, c) := k_\pi \oplus k_{\vec{v}, c},$$

Where, $$k_\pi := \bigoplus_{\vec{\Delta} \in T(\pi)} h_\pi(\vec{\Delta}),$$

$$k_{\vec{v}, c} := \bigoplus_{i \in F} l(i) f_c(i, \vec{v}).$$

Both adding a stone and removing a stone of color $\alpha \in \{b, w\}$ at position $\vec{\Delta}$ correspond to the same operation $k_\pi \leftarrow k_\pi \oplus h_\alpha$. Due to the commutativity of XOR the hash-key can be calculated incrementally as stones are added or removed from a pattern. However, we prefer to store the pattern classes $\tilde{\pi}$ instead of single patterns $\pi$ to take account of the relevant symmetries. This is achieved by choosing $\tilde{k}_\pi := \min_{\pi \in \tilde{\pi}} k_\pi$, i.e. by calculating the hash-key for every symmetry variant of the pattern and choosing the minimum of those hash-keys. (It is not essential to choose the minimum; any particular one of the hash-keys can be selected e.g. the maximum, as long as a consistent selection method is used in creation of the hash table.) The resulting hash-table allows us to store and retrieve information associated with each pattern without an explicit representation of the pattern itself. This could be the game-record the move was found in or relevant statistics, such as the percentage of games won after playing that move.

Pattern Harvesting

A particular example of pattern harvesting is now described in detail.

From a database of Go game records we harvest pattern classes $\tilde{\pi}$ corresponding to moves made by expert players. We let the computer play through each of the games in the collection and maintain a $|T| \times |\hat{\zeta}|$-table H of hash-keys corresponding to each of the pattern templates $T_i$ at each of the vertices $\vec{v} \in \hat{\zeta}$. The update after each move makes sure that if pattern class $\tilde{\pi}$ matches the resulting configuration c at vertex $\vec{v}$ then $H_{\alpha, \vec{v}} = \tilde{k}(\tilde{\pi})$. Whenever an entry in H changes, the new hash-key can be used to mark that pattern as being present in the collection.

A rough estimate shows that for 181,000 games records with an average length of 250 moves and $|T|=14$ different pattern templates we have about 600 million patterns at our disposal. To limit storage requirements and to ensure generalization to as yet unseen positions we only want to include in $\tilde{\Pi}$ those patterns that appear as a move made by an expert twice in the collection. We use a Bloom filter (Bloom, 1970) B to mark of patterns that have been seen at least once. For every pattern we observe we use B to check if it is new; if it is, we add it to B. if B indicates that the pattern has been seen before we increment the count in our pattern hash-table $D_{\tilde{\Pi}}$ that represents $\tilde{\Pi}$.

Learning from the Harvested Patterns or Harvested Pattern Classes

Once the patterns have been harvested we carry out a learning process to either learn an urgency value for each pattern class, or to learn a play probability for each pattern class. It is also possible to learn these factors for individual patterns as opposed to pattern classes.

The term "urgency" is used herein to refer to a latent variable, not directly observable, which provides an indication of the quality (or goodness) of playing a move (or pattern class).

In the case that we learn an urgency value for each pattern class a method of learning is now described with reference to FIG. 7. We use a probability distribution (such as a Gaussian or other distribution) to represent our belief about the urgency value of a particular pattern class. In a preferred embodiment we use a Gaussian belief distribution which is uniquely described by its mean and standard deviation. The area under a Gaussian belief distribution within a certain range corresponds to the belief that the urgency value will lie in that range. As the system learns more from the game records, the standard deviation has the tendency to become smaller, more tightly bracketing the urgency for the pattern class. Another way of thinking about the mean and standard deviation values is to consider them as the "average belief in the quality of a move or pattern class" and "the uncertainty" associated with the assessment of that quality, respectively.

Figure 7:
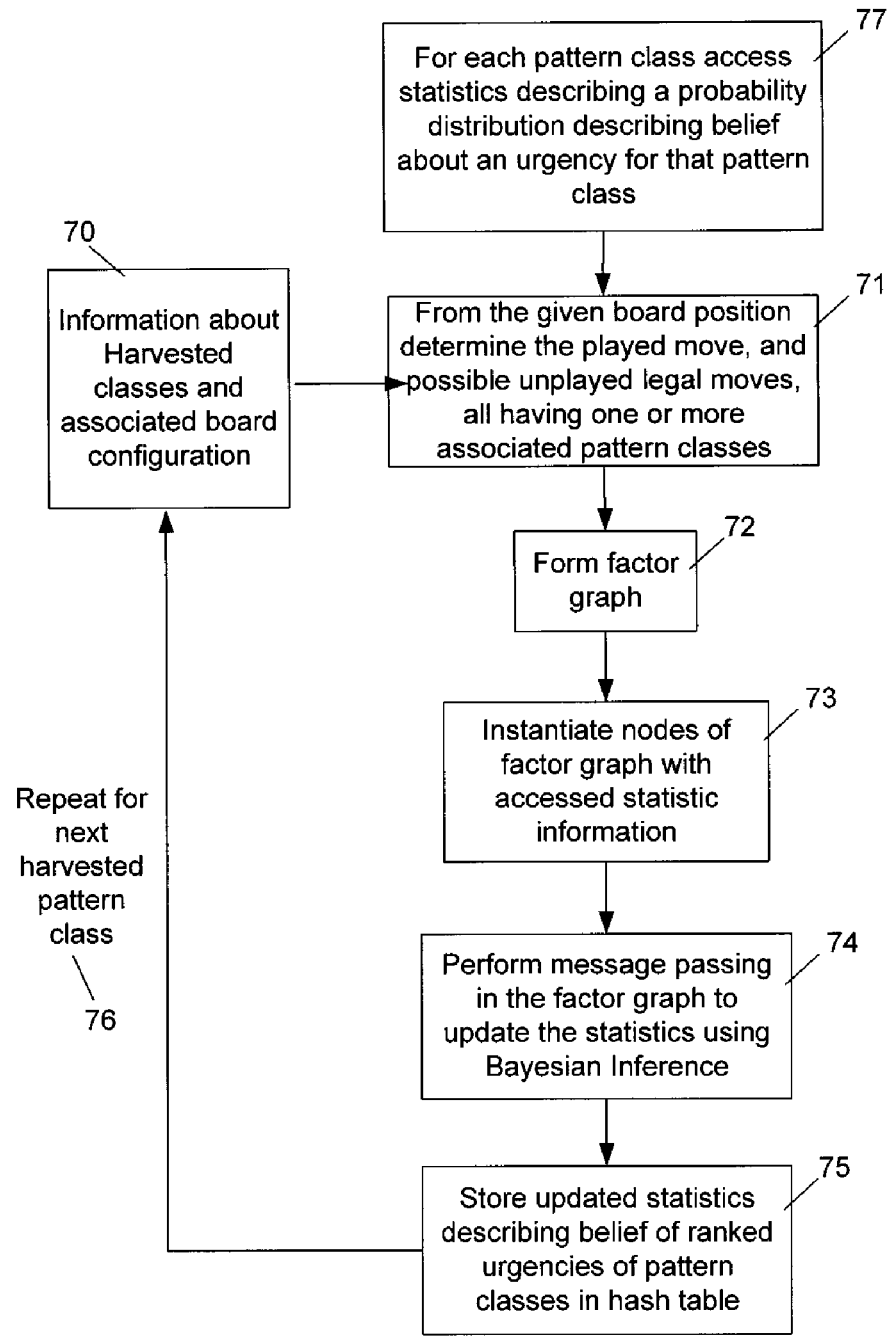
FIG. 7 is a flow diagram of a method of learning urgencies of pattern classes.

In FIG. 7 an example of our method for determining an indication of an urgency of a move (or pattern class) given a particular board configuration is described. The method involves, for each pattern class, accessing statistics (see box 77) describing a probability distribution over legal moves in a given board configuration. In a preferred embodiment we use one-dimensional Gaussian distributions to represent urgency belief. By using Gaussian distributions we achieve the advantage that such distributions can be uniquely described by two statistics, the mean and standard deviation, as explained above. In addition, the sum of two Gaussian random variables is itself a Gaussian random variable which enables us to simplify our computations. However, it is not essential to use Gaussian distributions to represent urgency belief.

If a pattern class has been analyzed before using our learning process and we have stored urgency information for that pattern class, that information is accessed. In the case of a new pattern class we use a default urgency belief distribution with associated default statistics, for example an initial mean of 0 and standard deviation of 1. Any suitable default belief distribution is used.

Information about the harvested pattern classes is obtained (see box 70) including an associated board configuration for each harvested pattern class. For a given harvested pattern class (and board configuration) we determine other possible legal moves, each having an associated pattern class (see box 71). Information about the rules of the game is used to determine the other possible legal moves.

We know that the harvested pattern class was played and that the other possible legal moves (here pattern classes) were not played. This information together with the statistics is used to form a factor graph (see box 72). The factor graph comprises nodes associated with particular pattern classes, those nodes being ordered on the basis of which pattern class was played and which pattern classes were not played. Some nodes of the factor graph are instantiated with the accessed statistics information (see box 73). Message passing is then performed over the factor graph to update the statistics thus carrying out Bayesian inference (see box 74). The resulting updated statistics describe our belief of the relative urgencies of the pattern classes and these results are stored (see box 75) for example, in a hash table or other suitable store. This process is repeated (see 76) for further harvested pattern classes.

Figure 5:
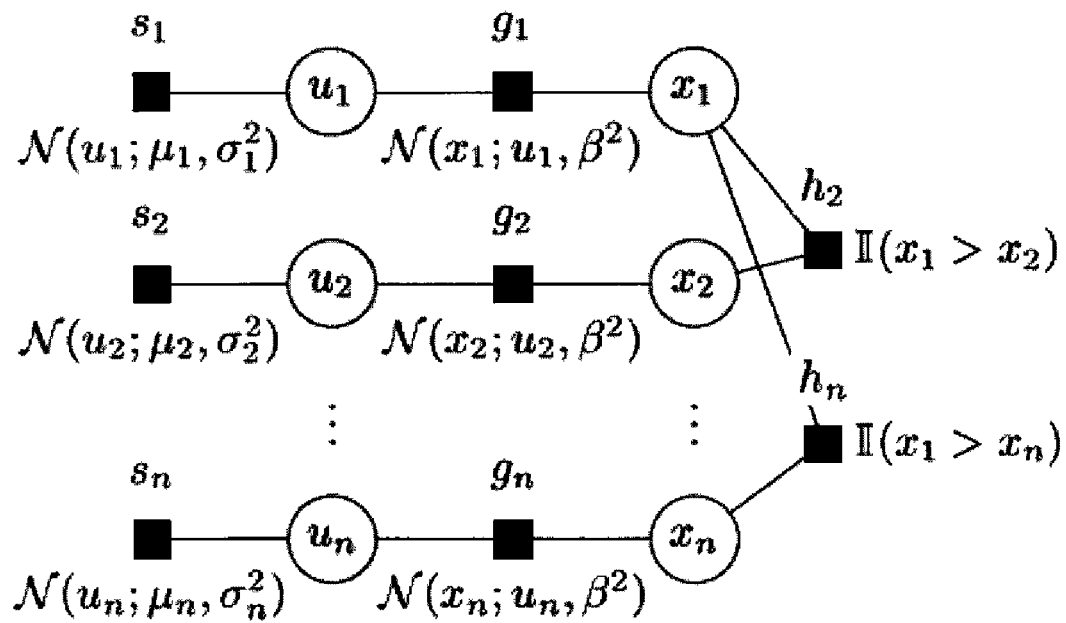
FIG. 5 is an example factor graph for three potential game moves, one of which is chosen by a player, the factor graph represents a ranking model.

More detail about the process of forming the factor graph is now given with reference to FIG. 5. The factor graph comprises nodes connected by links. The nodes are either variable nodes (circles) or factor nodes (squares). Variable nodes represent storage locations and factor nodes represent computational units. The factor nodes read and write information from and to their neighboring variable nodes, respectively, according to calculation rules described later.

In FIG. 5 each row of nodes relates to a particular pattern class with the upper most row relating to the pattern class corresponding to the played move and the other rows of nodes relating to pattern classes corresponding to legal but un-played moves for the same board configuration. The factor graph can be drawn in any suitable manner to capture these relationships, for example, using columns for each pattern class rather than rows. As illustrated in FIG. S the factor graph is preferably acyclic. Preferably it comprises two types of nodes, variable nodes and factor nodes, and it is bipartite, i.e, the only permissible type of connection is between a factor node and a variable node.

The factor nodes labeled s1, s2, . . . sn are functions which access a database or other store to obtain belief distributions for each pattern class (or use as a default distribution in the case of new pattern classes). These computational units feed the parameters describing the urgency belief distributions into the corresponding variable nodes. For example, in the case of Gaussian distributions there would be two parameters stored in each variable node. The next column of variable nodes, that is the circular nodes u1, u2 . . . un represent the urgencies of the pattern classes. These nodes each store the statistics describing the belief distribution for the associated pattern class. The next column of factor nodes are computation units g1, g2 . . . gn which compute the distribution corresponding to the effective urgency value in the observed configuration and feed the parameters into the corresponding variable nodes x1, x2 . . . xn. The remaining factor nodes h2, . . . hn encode which pattern class was played. These are order factor nodes which implement an order constraint indicating that the effective urgency value of the move made must have been greater than the effective urgency values of the moves not played. For these nodes the associated update equations are not exact as the true factor-to-variable messages are no longer Gaussian. The other factor nodes of FIG. 5 are exact factor nodes because their associated messages can be computed and represented exactly.

The process of message passing comprises carrying out a calculation associated with a computation node (square node of FIG. 5) using distribution parameters from neighboring variable nodes and passing the results to one of the neighboring variable nodes (circular nodes in FIG. 5). The direction of passing the results (also referred to as a processing schedule) is explained in more detail now with reference to FIG. 6.

Figure 6:
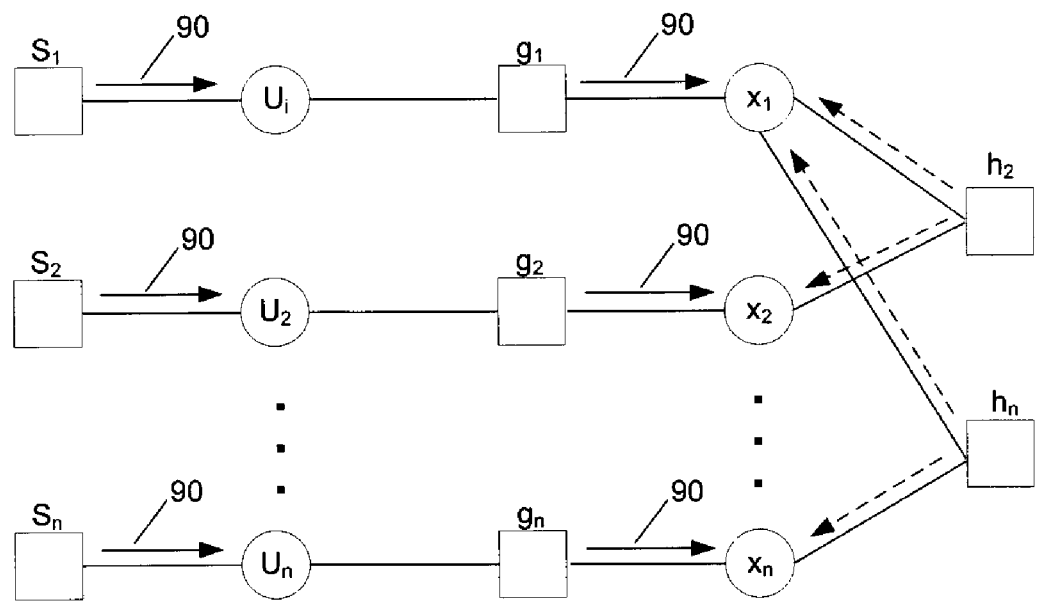
FIG. 6 shows the factor graph of FIG. 5 with arrows indicating scheduling.

The processing schedule is preferably divided into three phases: pre-processing, chain processing and post-processing. An example pre-processing schedule is illustrated by arrows 90 in FIG. 6. Starting at initial factor nodes s1, s2, . . . sn computation proceeds along the rows until nodes x1, x2, . . . xn are reached. The post processing schedule is the reverse of the pre-processing schedule but stopping at the variable nodes u1, u2, . . . un which may then contain the quantity of interest. After pre-processing a processing schedule is iterated until the belief distributions converge or stop changing. An example schedule is indicated in FIG. 6 using dotted arrows. When convergence is reached or substantially reached, then the post processing phase passes the distributions back to the left of the rows to obtain the new urgency statistics. Each arrow in the processing schedule represents a non trivial calculation and details of those calculations are given below.

We present general update equations for use in carrying out the computations along the arrows in the message passing process. We tailor those general update equations for use with Gaussian distributions as shown.

Factor Node Update with Gaussian Messages

Figure 11:
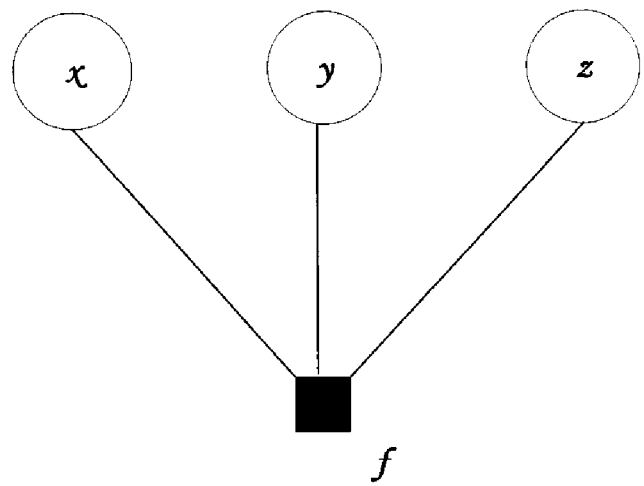
FIGS. 11 to 15 are example factor graphs.
Figure 11:
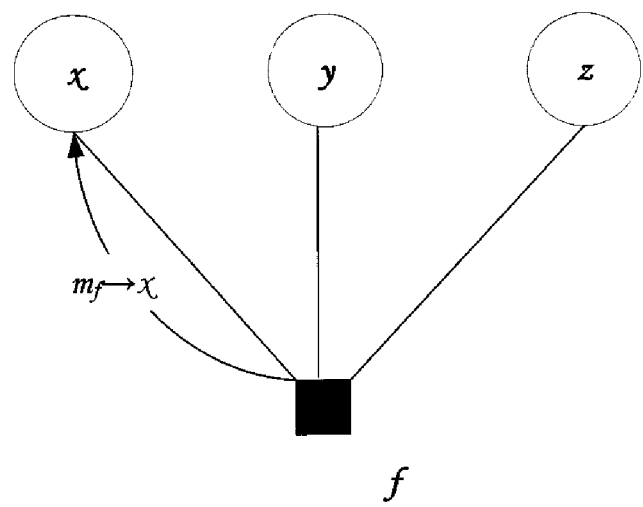

Consider the example of factor graph of FIG. 11.

Suppose we would like to update the message $m_{f \to x}$ and the marginal distribution $p_x$. Then, the general update equations are as follows:

$$m_{x \to f}(x) \propto \frac{p_x(x)}{m_{f \to x}(x)},$$

-continued $$m_{f \to x}^{true}(x) \propto \int \int f(x, y, z) \cdot \frac{p_y(y)}{m_{f \to y}(y)} \cdot \frac{p_z(z)}{m_{f \to z}(z)} dy dz,$$

$$p_x(x) = MM[m_{f \to x}^{true}(x) m_{x \to f}(x)],$$

$$m_{f \to x}(x) \propto \frac{p_x(x)}{m_{x \to f}(x)},$$

where MM[.] returns the distribution in the Gaussian family with the same moments as the argument and all quantities on the right are normalized to be distributions. In the following we use the exponential representation of the Gaussian, that is, $$G(x;\tau,\pi) \propto \exp(\pi x^2 - 2\tau x)$$

This density has the following relation to the standard density $$G(x; \tau, \pi) := N\left(x; \frac{\tau}{\pi}, \frac{1}{\pi}\right), \text{ or } N(x; \mu, \sigma^2) := G\left(x; \frac{\mu}{\sigma^2}, \frac{1}{\sigma^2}\right)$$

In the case of the exact factor nodes the update equations are given in the following table.

Figure 12:
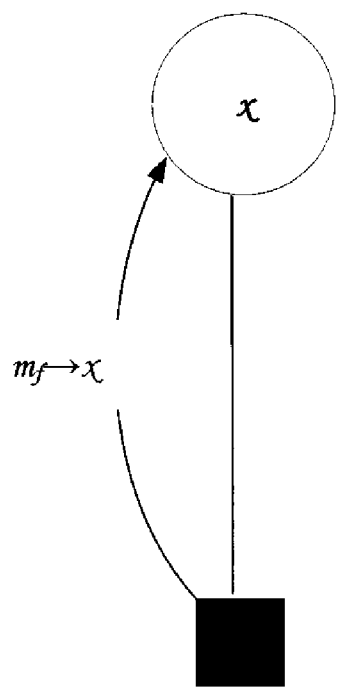
Figure 13:
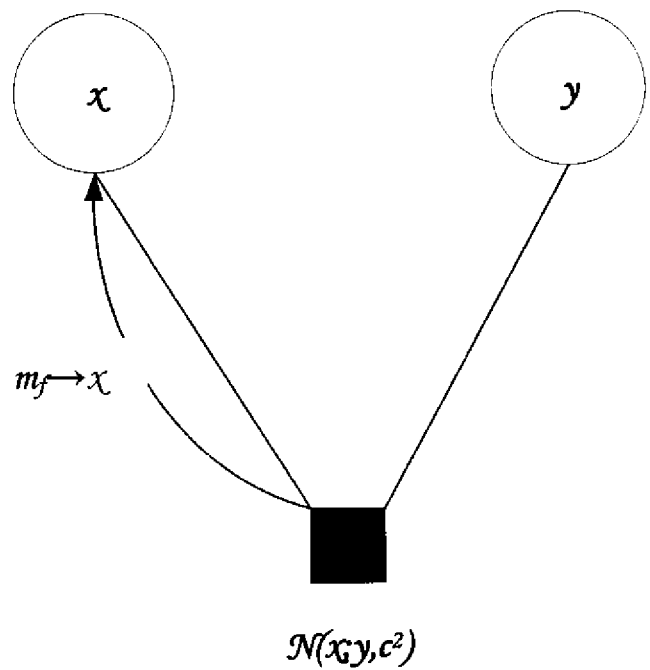
Figure 14:
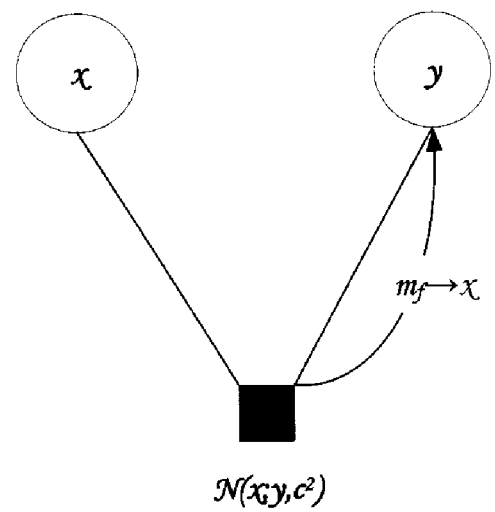
Figure 14:
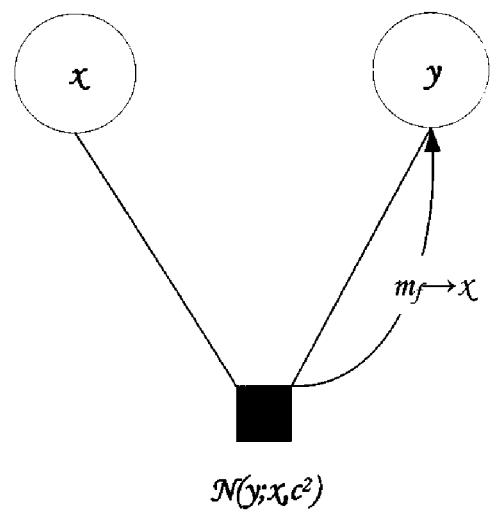

| Factor | Update equation |
|---|---|
| (FIG. corresponds to FIG. 12) $\mathcal{N}(x; m, v^2)$ | $\pi_x^{new} \leftarrow \pi_x + \frac{1}{v^2}$ <br> $\tau_x^{new} \leftarrow \tau_x + \frac{m}{v^2}$ <br> This is exact and should only be executed once. |
| (Corresponds to FIG. 13) $\mathcal{N}(x; y, c^2)$ | $\pi_{f \to x}^{new} \leftarrow \alpha(\pi_y - \pi_{f \to y})$ <br> $\tau_{f \to x}^{new} \leftarrow \alpha(\tau_y - \tau_{f \to y})$ <br> $\pi_x^{new} \leftarrow \pi_x + \pi_{f \to x}^{new} - \pi_f \to x$ <br> $\tau_x^{new} \leftarrow \tau_x + \tau_{f \to x}^{new} - \tau_f \to x$ <br> $\alpha := \frac{1}{1 + c^2(\pi_y - \pi_{f \to y})}$ |
| (See FIG. 14) $\mathcal{N}(x; y, c^2)$ | |
| (See FIG. 14) $\mathcal{N}(y; x, c^2)$ | |

In the case of the order factor nodes, the update equations are given in the following table.

Figure 15:
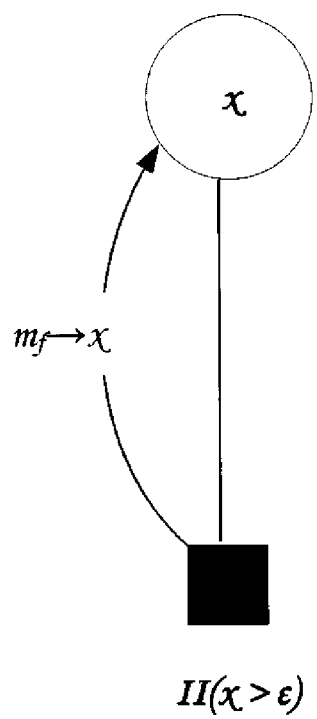

| Factor | Update equation |
|---|---|
| (Corresponds to FIG. 15) $\mathbb{I}(x > \varepsilon)$ | $\pi_x^{new} \leftarrow \frac{c}{1 - \omega\left(\frac{d}{\sqrt{c^2}}\varepsilon\sqrt{c}\right)}$ <br> $\tau_x^{new} \leftarrow \frac{d + \sqrt{c} \cdot v\left(\frac{d}{\sqrt{c^2}}\varepsilon\sqrt{c}\right)}{1 - \omega\left(\frac{d}{\sqrt{c^2}}\varepsilon\sqrt{c}\right)}$ <br> $\pi_{f \to x}^{new} \leftarrow \pi_{f \to x} + \pi_x^{new} - \pi_x$ <br> $\tau_{f \to x}^{new} \leftarrow \tau_{f \to x} + \tau_x^{new} - \tau_x$ <br> $c = \pi_x - \pi_{f \to x}, \quad d = \tau_x - \tau_{f \to x}$ |

In the update equations set out in the tables above a represents weightings which in a preferred example are set to 1. Also, in the update equations v and w correspond to the functions v(.,.) and w(.,.) given by $$v(t, \alpha) = \frac{N(t - \alpha)}{\Phi(t - \alpha)}$$

$$w(t, \alpha) = v(t, \alpha) \cdot (v(t, \alpha) - (t - \alpha))$$

Where the symbols N and Φ represent the density of the Gaussian distribution function and the cumulative distribution function of the Gaussian, respectively. The symbols t and α are simply arguments to the functions. Any suitable numerical or analytic methods can be used to evaluate these functions such as those described in Press et al., Numerical Recipes in C: the Art of Scientific Computing (2d. ed.), Cambridge, Cambridge University Press, ISBN-0-521-43108-5.

In the example shown in FIG. 6 the message passing during the schedule involves order factor node updates from the nodes h to the nodes x using the update equation of the first row of the order factor node update equation table.

In the case of exact factor nodes, for message passing from a computation node (square node) to a single variable node (circular node) the update equations of the first row of the exact factor node update equation table is used. In the case of message passing from a computation node to two variable nodes the update equations of the second or third row of the table are used as appropriate.

Figure 9:
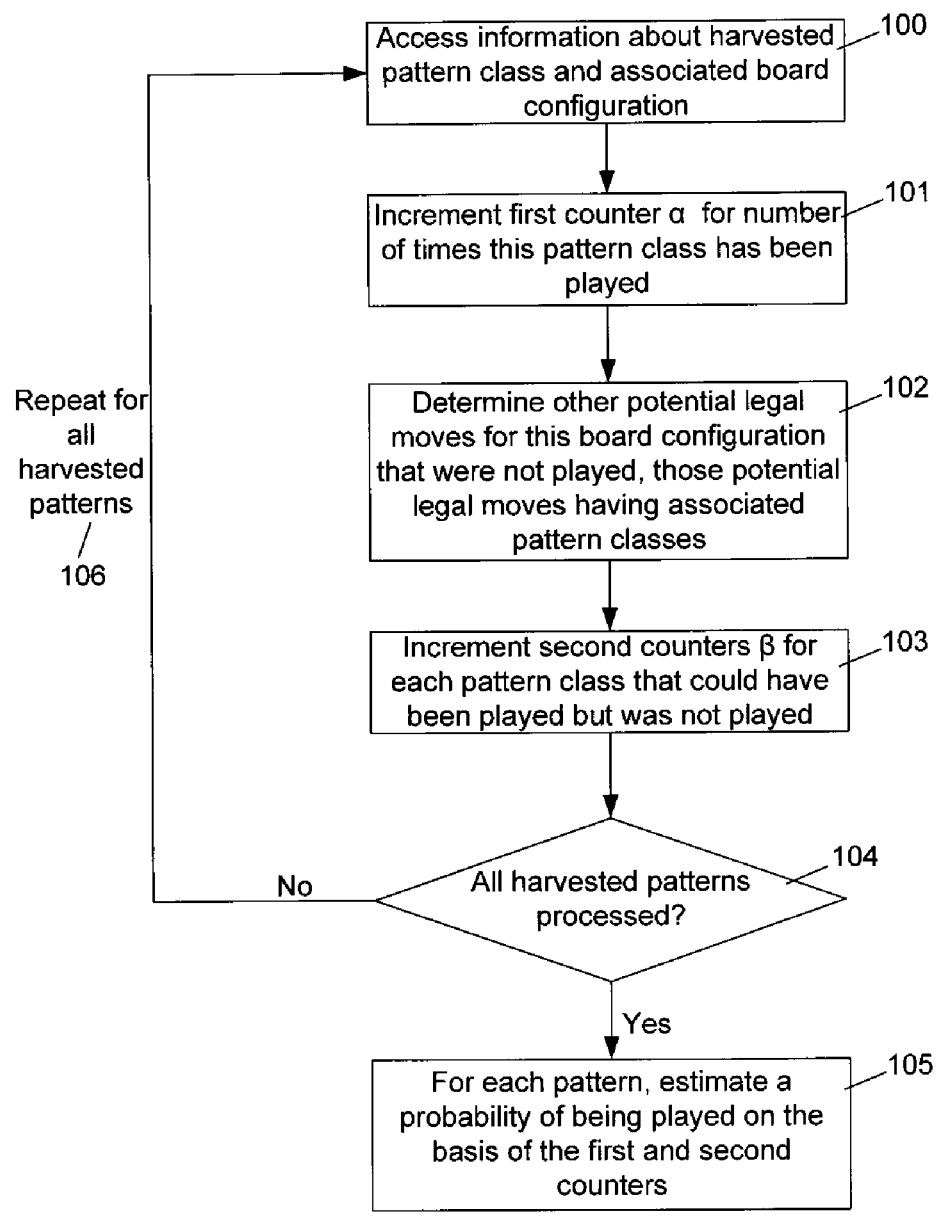
FIG. 9 is a flow diagram of a method of learning probabilities of being played for pattern classes.

In other embodiments we learn a play probability (probability of being played given a particular board configuration) for each pattern class. This is now described with reference with FIG. 9. Information about a harvested pattern class and its associated board configuration is accessed (see box 100). A first counter is then incremented to indicate that this pattern class has been played (see box 101). We determine (using information about the rules of the game) other potential legal moves for the particular board configuration. These potential legal moves were not played. We identify the associated pattern classes for these potential legal moves (see box 102). Second counters are then incremented for each pattern class that could have been played but was not played (see box 103). If all harvested pattern classes have been processed (see box 104) then we proceed to estimate a probability of being played for each pattern class (see box 105). If there are more harvested patterns to process then we repeat the earlier method (see 106 in FIG. 9). The estimate of the probability of being played is made on the basis of the first and second counters (see box 105). The estimates are stored in any suitable manner. A particular example of this method is described in detail below under the heading Independent Bernoulli Model.

Using the Learnt Information to Play Games

Once the learning phase has been completed to learn from the harvested patterns we are able to use the results to select a move or rank possible moves, given a particular board configuration. This is now described with reference to FIG. 8. In some embodiments we learn urgency belief statistics and in other embodiments we learn estimates of probabilities of play. All embodiments involve learning belief distributions.

At a high level, we access the current board configuration, and for each possible board location where the next move could be played (all legal potential play positions) we find any harvested patterns which match. Any suitable pattern matching technique is used. For example, we can search for exact matches only, or allow inexact matches within specified bounds. We then select one of the matched pattern classes on the basis of the learnt urgency belief or play probability information. In a preferred embodiment we carry out the pattern matching process in an order on the basis of the size of the pattern templates. This is not essential but it enables us to give preference to patterns of larger size. It would also be possible to give preference to patterns of a specified size range or patterns having particular characteristics. One could also combine patterns of different sizes.

Figure 8:
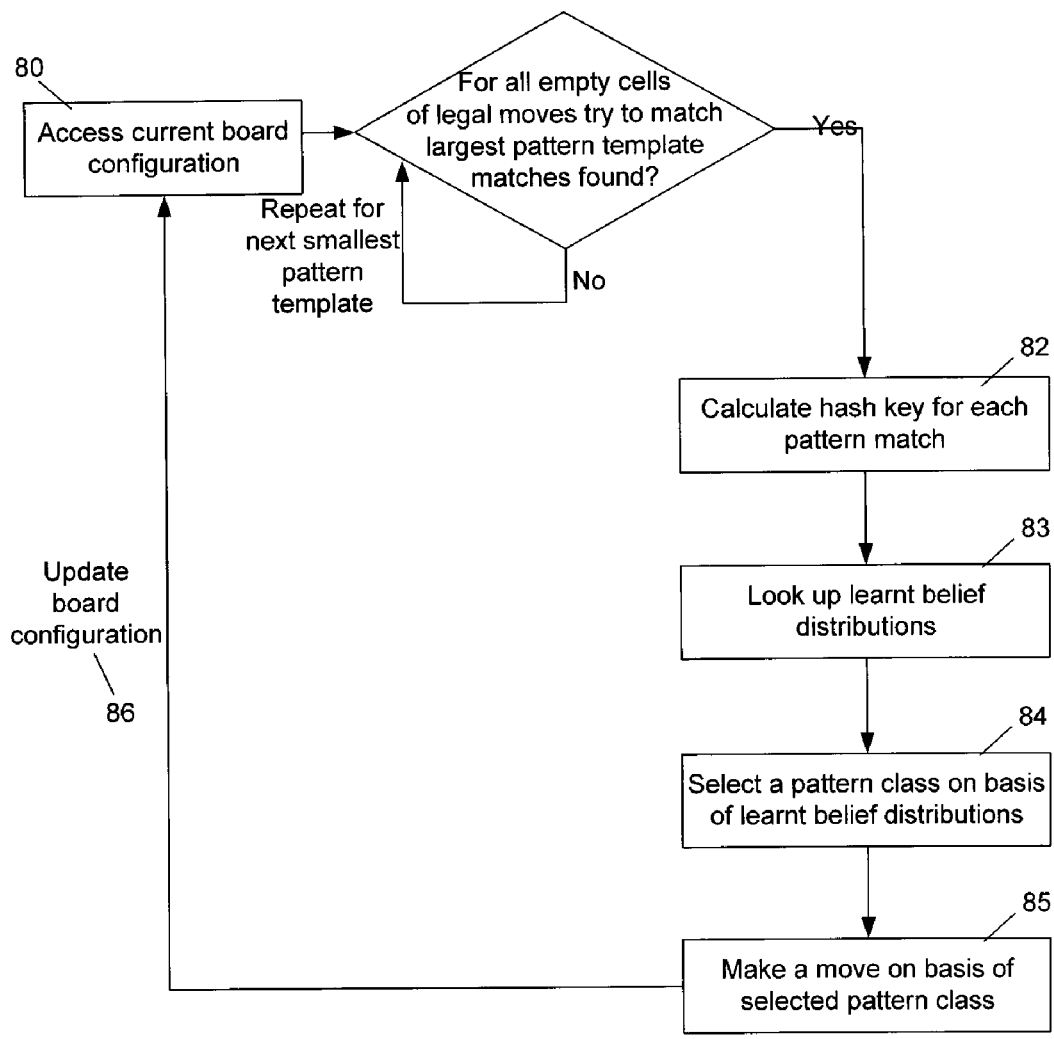
FIG. 8 is a flow diagram of an automated method of playing a game using urgencies of pattern classes.

As shown in FIG. 8 we access the current board configuration (see box 80). This is achieved in any suitable manner via a user interface, or other interface to our automated game system. For each possible board grid location where the next stone could be played (all legal potential play positions) we try to match the largest pattern template in the current board configuration. This is done in any suitable manner. For example, for pattern template 14 there might be no harvested pattern classes which match the current board configuration. We then try the next smallest pattern template (see FIG. 8). This continues until we find a pattern template which has one or more harvested pattern classes which match regions of the current board configuration. We select one of the matched pattern classes for each possible play position in any suitable manner (although there may be some play positions which have no matches). The selection can be arbitrary or on the basis of the learnt information for example. We access the learnt information for the selected matched pattern class. For example, if the learnt information is stored using a hash table, we calculate a hash key for the matched pattern class (see box 82) and then look up the learnt belief distributions (see box 83). We then select (see box 84) one of the matched pattern classes on the basis of the learnt information. The automated system is then able to play the next move of the game on the basis of the selected pattern class (see box 85) and the board configuration is updated (see box 86).

As mentioned above, the learnt information can be used for other purposes besides creating an automated player of a game. For example, the learnt information can be used in study or training tools for those seeking to improve their game playing skills. It can also be provided as input to automated game playing systems which use other approaches such as tree search or Monte Carlo game playing systems.

Figure 10:
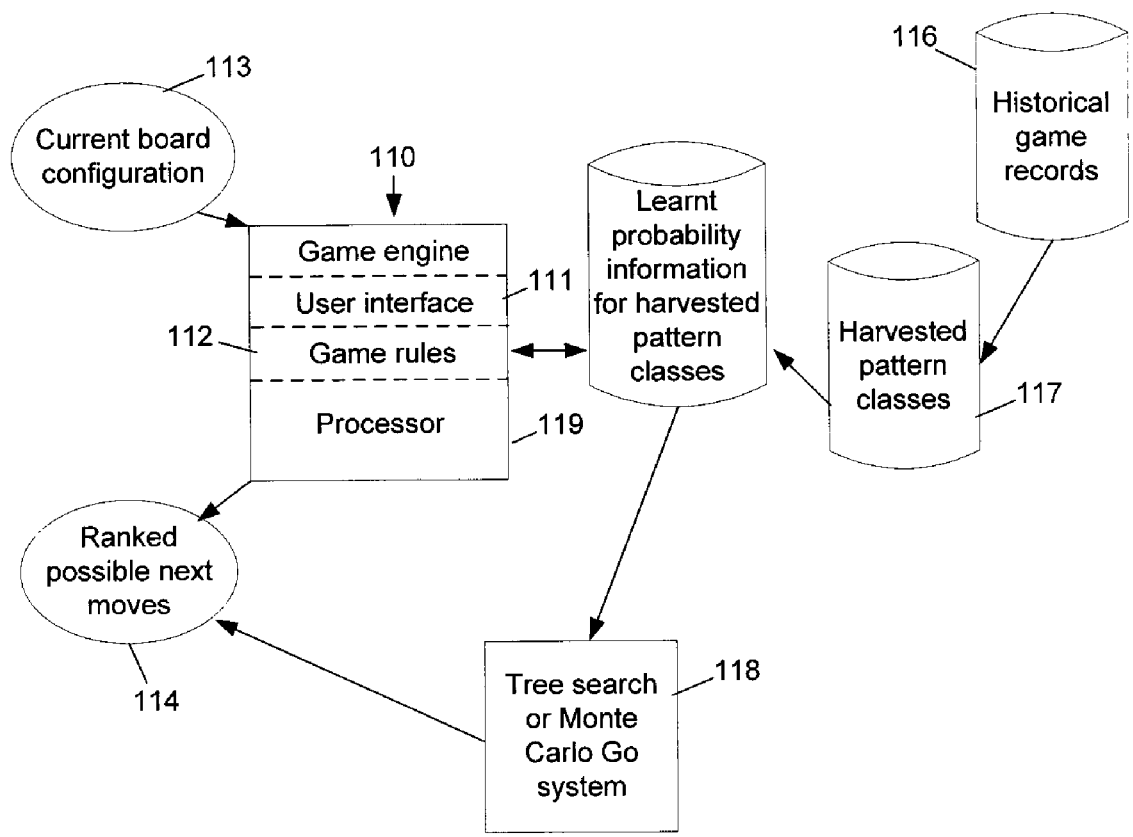
FIG. 10 is a schematic diagram of a game engine as part of a system for playing a game.

FIG. 10 is a schematic diagram of a game engine 110 as part of a system for playing a game. The game engine comprises a user interface 111 of any suitable type such as a graphical user interface arranged to be displayed on a display screen with an associated keyboard or other user input means. Information about the game rules 112 is either stored at the game engine or accessible to the game engine from another entity. A processor 119 is also provided which can be a personal computer, a games console or a computer of any suitable type with software to support and enable the game engine to operate. The game engine is provided as a software application on the personal computer or as dedicated hardware or in any suitable manner as known in the art.

The game engine 110 has an input arranged to receive a current board configuration 113. For example, this can be via the user interface or input received as an email, flat file or any other suitable medium. The game engine 110 also has access to learnt probability information 11S for harvested pattern classes 117 obtained from historical game records 116. The learnt probability information is stored in any suitable manner either integral with the game engine or at another entity in communication with the game engine.

The game engine provides ranked possible next moves 114 as output or one selected next move for play. It can also provide a list of legal moves with associated urgency statistics or probability of play. Optionally the system also comprises a tree search, Monte Carlo game system 118 or other game system which uses techniques different to that of the game engine itself. The learnt probability information 115 and/or the ranked possible next moves 114 are used by that optional game system 118 to tailor or focus the processing of that system.

A preferred embodiment involving urgencies is now described:

Bayesian Pattern Ranking

Model

We now present an example model of the probability $P(\vec{v}|c)$ of an expert Go player making a move (at vertex) $\vec{v} \in \zeta$ in board configuration c. We only consider legal moves $\vec{v} \in L(c)$, where $L(c) \subseteq \zeta$ is the set of legal moves in configuration c.

A move at $\vec{v}$ in configuration c is represented by the largest pattern class $\tilde{\pi}_{max}(\vec{v},c) \in \Pi$ that matches c at $\vec{v}$. In our Bayesian model, we use a Gaussian belief $p(u)=N(u;\mu,\text{diag}(\sigma^2))$ over urgencies $u(\tilde{\pi})$ of pattern classes $\tilde{\pi}$. Then the predictive distribution is given by $P(\vec{v}|c)=\int P(\vec{v}|c,u)p(u)du$. Our likelihood model $P(\vec{v}|c,u)$ is defined via the notion of a latent, unobserved urgency $x(\tilde{\pi})$ for each pattern class, where $p(x|u)=N(x;u,\beta^2)$ is also assumed to be Gaussian with mean u and a fixed variance $\beta^2$; the value of $\beta$ expresses the variability of the urgency depending on specific position and player characteristics. In this sense, $\beta$ can also be related to the consistency of play and can be chosen smaller for stronger players. We assume that an expert makes the move with the highest effective urgency value, hence, $$P(v|c, u) := P\left(\begin{array}{l}\text{argmax}\{x(\tilde{\pi}_{max}(\vec{v}', c))\} = \vec{v} \\ \vec{v}' \in L(c)\end{array}\right) \quad (1)$$

This model can be expressed as a factor graph of the type shown in FIG. 5. The probability (1) can be efficiently calculated by Expectation Propagation (EP) message passing in factor graphs.

Learning and Inference

A goal of learning is to determine the parameters $\mu$ and $\sigma^2$ of the belief distribution $p(u)=N(u;\mu,\text{diag}(\sigma^2))$ from training data. The Bayesian posterior is given by $$p(u|\vec{v},c) = \frac{P(\vec{v}|c,u)p(u)}{P(\vec{v}|c)}.$$

In general, this posterior is no longer a Gaussian and has non-zero covariance. We use a local assumed density filtering to approach where we seek the best (diagonal) Gaussian approximation $q(u|\vec{v},c)$ to the posterior $P(u|\vec{v},c)$ in the sense of minimum Kullback-Leibler divergence when leaving out one factor from $P(\vec{v}|c,u)$. Once a move at vertex $\vec{v}$ at configuration c has been incorporated into the prior p(u), the posterior $p(u|\vec{v},c)$ is based as the prior for the next expert move at the new board configuration. Again inference can be performed efficiently using EP message passing.

The factor graph (see FIG. 5) expresses the joint distribution $p(\vec{v},u,x|c)$:

$$p(\vec{v},u,x|c) = \prod_{i=1}^{n} s_i(u_i) \prod_{j=1}^{n} g_j(x_j,u_j) \prod_{k=2}^{n} h_k(x_1,x_k),$$

where $s_i(u_j)=N(u_i;\mu_i,\sigma_i^2),$ $g_j(x_j,u_j)=N(x_j;u_j\beta^2),$ $h_k(x_l,x_k)=\Pi(x_l>x_k).$ We are interested in determining the marginals $p(u_i)$ of the joint distribution defined above. This can be accomplished by a sum-product algorithm. Examples of such an algorithm are given in Jordan & Weiss, 2002 "Graphical models: probabilistic inference". In M. Arbib (Ed.), Handbook of neural networks and brain theory. MIT Press. $2^{nd}$ edition.

For any variable, $v_i$, connected to its neighboring factors, $f_k \in \text{neigh}(v_i)$, the marginal distribution of $v_i$ is given by $$p(v_i) = \prod_{f_k \in neigh(v_i)} m_{f_k \to v_i}(v_i) \quad (2)$$

where $m_{f_k \to v_o}(v_i)$ denotes a 'message' function passing from factor $f_k$ to variable $v_i$. Messages are calculated as follows to perform exact inference on a factor tree. For notational convenience, we only state the factor-to-variable message equation for the first variable, $v_o$.

$$m_{f_k \to v_o}(v_o) = \int f_k([v_o;v]) \prod_{j=1}^{n} m_{v_j \to f_k}(v_j) dv, \quad (3)$$

$$m_{v_i \to f_k}(v_i) = \prod_{j \in neigh(v_i) \setminus \{f_k\}} m_{f_k \to v_j}(v_j). \quad (4)$$

These equations derive from the fact that we can make use of the conditional independence structure of the joint distribution to rearrange the marginalization integral and thus simplify it.

We make the approximation that all messages are Gaussian densities to reduce storage requirements (messages can be represented by two numbers) and to simplify the calculations. For factors $f_k$ of general form, the factor-to-variable message calculated by (3) are not necessarily Gaussian. Therefore we approximate these messages by a Gaussian which minimizes the Kullback-Leibler divergence between the marginal distribution, $p(v_i)=m_{f_k \to v_i}(v_i) \cdot m_{v_i \to f_k}(v_i)$, and its Gaussian approximation, $q(v_i)=\hat{m}_{f_k \to v_i}(v_i) \cdot m_{v_i \to f_k}$, where $\hat{m}_{f_k \to v_i}(v_i)$ is the approximate (Gaussian) message from factor $f_k$ to variable $v_i$. That is, $$\hat{m}_{f_k \to v_i}(v_i) = \frac{MM[m_{f_k \to v_i}(v_i) \cdot m_{v_i \to f_k}(v_i)]}{m_{v_i \to f_k}(v_i)} \quad (5)$$

where MM demotes 'Moment Match'.

The goal of learning is to determine (from training data) the parameters $\mu_i$ and $\sigma_i^2$ of the belief distribution $p(u_i)=N(u_i;\mu_i,\sigma_i^2)$ for the value of each pattern. We calculate the posterior $p(u|\vec{v},c)$ by first propagating messages about the graph according to (3), (4) and (5) until convergence. The approximate posterior distributions we require are $$p(u_i)=m_{g_i \to u_i}(u_i) \cdot m_{g_i \to u_i}(u_i) \quad (6)$$

Once a move at vertex $\vec{v}$ at configuration c has been incorporated into the prior p(u), the posterior $p(u|\vec{v},c)$ is used as the prior for the next expert move at the new board configuration. This approach is a form of assumed-density filtering.

Independent Bernoulli Model

We also consider an alternative approach where we assume that each pattern class is played independently of the other available pattern classes with probability $p_{\vec{v},c}:=p(\tilde{\pi}_{max}(\vec{v},c))$ (the probability of the maximal pattern class matched at vertex $\vec{v}$ in configuration c). The probability of a move at location $\vec{v}$ in position c given the pattern probabilities, p, is $$p(\vec{v}|c,p) = p_{\vec{v},c} \cdot \prod_{\vec{v}' \in L(c)\setminus \vec{v}} (1 - p_{\vec{v}',c}).$$

Our uncertainty on the $p_{\vec{v},c}$ is modeled by a conjugate Beta prior $p(p_{\vec{v},c})=\text{Beta}(p_{\vec{v},c};\alpha_{\vec{v},c},\beta_{\vec{v},c})$ so the marginal probability of a move $P(\vec{v}|c,\alpha,\beta)$ is $$\int p(\vec{v}|c, p) \prod_{\vec{v}' \in L(c)} \text{Beta}(p_{\vec{v}',c}; \alpha_{\vec{v}',c}, \beta_{\vec{v}'}, c) dp =$$

$$\frac{\alpha_{\vec{v},c}}{\alpha_{\vec{v},c} + \beta_{\vec{v},c}} \cdot \prod_{\vec{v}' \in L(c) \setminus \vec{v}} \left(1 - \frac{\alpha_{\vec{v}',c}}{\alpha_{\vec{v}',c} + \beta_{\vec{v}',c}}\right),$$

where $\alpha_{\vec{v},c}$ corresponds to the number of times this pattern class $\tilde{\pi}_{max}(\vec{v},c)$ matched for a move played by an expert in the training data and $\beta_{\vec{v},c}$ corresponds to number of times the pattern class matched $\tilde{\pi}_{max}(\vec{v},c)$ for moves that were available but not chosen.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of preferred embodiments are given by way of example only and that various modifications may be made by those skilled in the art. For example, the embodiments are described with reference to the game of GO and are also applicable to other games such as Chess, Connect6, Gomoku, Renju, Pente, Philosopher's Football, Connection games such as Hex, TwixT, Y, Havannah and *Star; The game of the Amazons, Janggi, Shogi, Xiangqi, Abalone, Alak, and Reversi (also known as Othello (trade mark)). The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of learning a belief distribution for each of a plurality of patterns, each pattern corresponding to a move in a game, wherein the method is implemented by a processor executing computer-executable instructions stored in a computer-readable storage medium, the method comprising:

accessing a collection of historical game records comprising sequences of moves;

extracting, by the processor, one or more patterns for each move and selecting some of those patterns as harvested patterns and discarding others of those patterns to create pattern classes from the harvested patterns, wherein the harvested patterns are extracted from the historical game records on a basis of a set of pattern templates, wherein the processor uses the set of pattern templates for selecting as the harvested patterns those patterns that occur at least twice in the collection, while discarding patterns that do not occur at least twice;

for each the pattern classes, determining other patterns corresponding to alternative legal moves which could have been played;

accessing, for each pattern class, statistics describing a probability distribution associated with a belief about an urgency of a move relating to that pattern class, wherein the statistics are represented by a mean and a standard deviation of the probability distribution;

updating the statistics represented by the mean and standard deviation associated with each pattern class during a learning process based on the harvested patterns for each pattern class for learning a belief distribution over a value of the urgency of each of the selected pattern classes, wherein the mean of the updated statistics represents a belief in a quality of a move associated with the pattern class;

storing the updated statistics and the corresponding pattern class for access by a game engine; and accessing the updated statistics and corresponding pattern classes by the game engine during game play for ranking potential next moves when selecting a game move from among the potential next moves during game play.

2. A method as claimed in claim 1 wherein the updating the statistics further comprises:

forming a factor graph comprising nodes, said factor graph being formed on the basis of the pattern class and associated other patterns corresponding to alternative moves which could have been played;

instantiating computation nodes in the factor graph with the statistics for the pattern class;

using message passing over the factor graph for learning a belief distribution over the value of the urgency of each of the selected pattern classes for updating the statistics represented by the mean and standard deviation associated with each pattern class.

3. A method as claimed in claim 1, wherein a plurality of nested pattern templates are used having specified symmetric properties.

4. A method as claimed in claim 1 wherein a belief distribution is learnt for each of a plurality of pattern classes, a pattern class comprising at least a plurality of symmetrically and rotationally equivalent patterns.

5. A method as claimed in claim 1, wherein the ranking the potential next moves during game play further comprises:

determining a list of legal next moves during game play using the pattern classes and rules of the game; and providing the list of legal next moves ranked according to associated updated statistics as an output of ranked potential next moves, wherein the standard deviation of the updated statistics indicates an uncertainty associated with the belief represented by the mean of the updated statistics regarding the quality of the move.

6. A method as claimed in claim 1 wherein the step of extracting patterns further comprises identifying one or more local pattern features associated with those patterns using pre-specified criteria.

7. A method as claimed in claim 6 which further comprises mapping each local pattern feature to a binary value.

8. A method as claimed in claim 1 wherein the belief distribution over the value of the urgency of a pattern class is obtained on the basis that each pattern class is played independently of the other patterns corresponding to alternative moves that could have been played.

9. A method as claimed in claim 1,
wherein, when the pattern class has been analyzed before, stored urgency value statistics are accessed as the accessed statistics, and
wherein, when the pattern class has not been analyzed before, default urgency value statistics are assigned as the accessed statistics.

10. A method as claimed in claim 1, wherein learning a belief distribution over a value of the urgency of each of the selected pattern classes further comprises using Bayesian inference.

11. A method as claimed in claim 2, wherein forming the factor graph comprising nodes includes forming a first row of nodes corresponding to the pattern class of a played move, and forming one or more second rows of nodes corresponding to one or more other pattern classes of alternative moves legal moves which could have been played.

12. A computer-readable storage medium having computer-executable instructions executed by a processor for performing a computer process implementing the method of claim 1.

13. A method, wherein the method is implemented by a processor executing computer-executable instructions stored in a computer-readable storage medium, the method comprising:
accessing a collection of historical game records comprising sequences of moves for extracting one or more patterns for the moves;
using, by the processor, a set of pattern templates for selecting those patterns that occur at least twice in the collection and discarding others of those patterns;
identifying pattern classes of the selected patterns by calculating a hash-key for symmetry variants of the selected patterns;
storing properties of the pattern classes as hash values without storing explicit representations of the patterns;
for the pattern classes and associated board configuration information, determining alternative legal moves which could have been played based upon game rules, each alternative move having an associated other pattern class;
accessing, for each pattern class, statistics describing a probability distribution associated with belief about an urgency of a move relating to that pattern class, wherein the statistics are represented by a mean and a standard deviation of the probability distribution, wherein the mean indicates a belief in the quality of an associated move and the standard deviation indicates an uncertainty associated with the quality;
forming a factor graph comprising a plurality of rows of nodes, said factor graph being formed on the basis of the pattern class and associated patterns corresponding to alternative legal moves which could have been played, such that each row relates to a particular pattern class;
instantiating computation nodes in the factor graph with the statistics for the pattern class and the associated pattern classes of associated patterns corresponding to alternative legal moves which could have been played;
updating the statistics associated with each pattern class based on the selected patterns by using message passing over the factor graph for learning a belief distribution regarding a value of the urgency of each of the pattern classes, wherein the updated statistics represent the belief in the quality of a move associated with the pattern class, wherein the urgency value is derived from the probability distribution over legal moves in a given game configuration and includes an updated mean and updated standard deviation of the updated statistics, wherein the updated mean indicates a belief in a quality of an associated move and the updated standard deviation indicates an uncertainty associated with the quality;
storing the updated statistics and the corresponding pattern classes for access by a game engine during a game;
accessing the pattern classes and the stored updated statistics for the pattern classes by the game engine during game play when selecting a game move from among potential next game moves during game play;
for the potential next game moves, identifying one or more of the stored pattern classes that substantially matches a pattern associated with the potential nest game move; and
ranking the potential next game moves on a basis of the stored updated statistics of the substantially matched pattern classes; and
providing a list of ranked potential next game moves ranked according to the corresponding stored updated statistics.

14. A method as claimed in claim 13,
wherein, when the pattern class has been analyzed before, stored urgency value statistics are accessed as the accessed statistics, and
wherein, when the pattern class has not been analyzed before, default urgency value statistics are assigned as the accessed statistics.

15. A method as claimed in claim 13 wherein the step of identifying one or more of the selected patterns comprises a pattern matching process that is arranged to give priority to patterns on the basis of pattern size by selecting a largest pattern size applicable.

16. A method as claimed in claim 13 which further comprises providing a plurality of the ranked potential next game moves to a tree search system such that a focused tree search or Monte Carlo search can be carried out relating to the game.

17. A method as claimed in claim 13, wherein forming the factor graph includes forming a first row of nodes corresponding to the pattern class of a played move and forming one or more second rows of nodes corresponding to the alternative moves to that which could have been played.

18. A computer-readable storage medium having computer-executable instructions executed by a processor for performing a computer process implementing the method of claim 13.

19. A system for automatically playing a game comprising:
a user interface arranged to receive a game configuration of a game;
a processor coupled to a storage medium storing program instructions that configure the processor to implement a game engine configured to receive the current game configuration of the game as an input, the game engine having access to rules of the game and arranged to automatically determine a plurality of potential game moves and associated pattern classes from the game configuration;
wherein the processor is further configured to access a harvested pattern class store to access information about harvested pattern classes corresponding to historical game moves and also to access learnt belief distributions for each harvested pattern class, the harvested pattern classes having been generated by accessing a collection of historical game records comprising sequences of moves for extracting one or more patterns for the moves, and using a set of pattern templates for selecting those patterns that occur at least twice in the collection for inclusion in the harvested pattern class, while discarding patterns that do not occur at least twice, wherein the learnt belief distributions are determined and stored in advance during a learning process for each of the harvested pattern classes by:

determining, based on game rules, other patterns corresponding to alternative legal moves which could have been played in place of a move related to the harvested pattern class;

accessing, for each pattern class, statistics describing a probability distribution associated with a belief about an urgency of a move relating to that pattern class, wherein the statistics are represented by a mean and a standard deviation of the probability distribution, wherein the mean indicates a belief in a quality of an associated move and the standard deviation indicates an uncertainty associated with the quality;

updating the statistics associated with each selected pattern class during the learning process as patterns corresponding to the selected pattern class are harvested from historic game records for learning a belief distribution regarding a value of an urgency each of the pattern classes, wherein the updated statistics represent the belief in the quality of the move associated with the pattern class;

wherein the processor is further arranged to, for each potential game move, identify one or more of the harvested pattern classes that substantially matches the pattern associated with that potential game move; and wherein the processor is further arranged to select one of the potential game moves on a basis of the updated statistics of the substantially matched pattern classes and provide the selected potential game move as output.

* * * * *